C. E. & C. H. WHITE.
RAKING DRUM.
APPLICATION FILED AUG. 17, 1908.
983,662.
Patented Feb. 7, 1911.
2 SHEETS—SHEET 1.
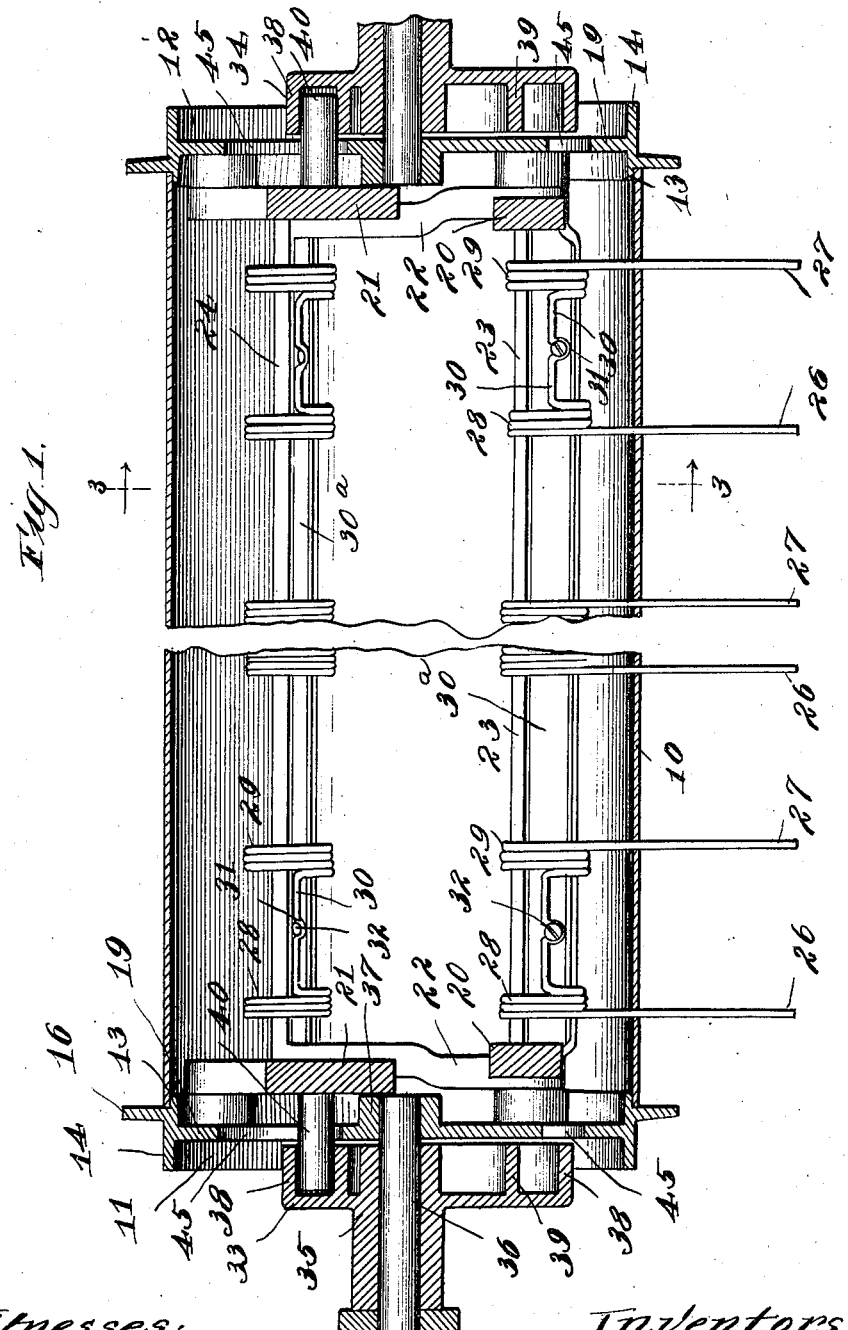
Witnesses:
G. A. Pauberschmidt
Hilda J. Orbeen
Inventors:
Charles E. White,
Charles H. White,
By Gilson & Gilson Attys.

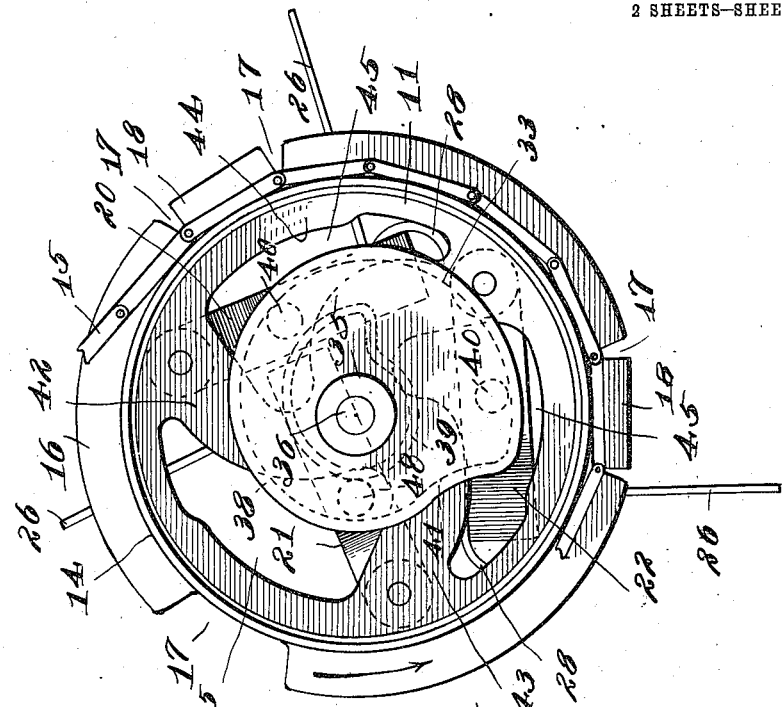

UNITED STATES PATENT OFFICE.

CHARLES E. WHITE AND CHARLES H. WHITE, OF MOLINE, ILLINOIS.

RAKING-DRUM.

983,662.  Specification of Letters Patent.  Patented Feb. 7, 1911.

Application filed August 17, 1908. Serial No. 448,921.

*To all whom it may concern:*

Be it known that we, CHARLES E. WHITE and CHARLES H. WHITE, citizens of the United States, and residents of Moline, county of Rock Island, and State of Illinois, have invented certain new and useful Improvements in Raking-Drums, of which the following is a specification, and which are illustrated in the accompanying drawings, forming a part thereof.

The invention relates to raking drums adapted to gather the hay from the ground to deliver it to elevating mechanism in connection with such machines as side-delivery rakes and hay loaders.

The object of the invention is to provide for the proper control of the raking teeth while permitting reasonable play thereof to prevent injury to the mechanism by obstacles which may be encountered during the raking operation.

The invention consists in the structure hereinafter described, and which is illustrated in the accompanying drawings, in which—

Figure 1 is a longitudinal section through the drum on the line 1—1 of Fig. 3; Fig. 2 is an end view of the drum; and Fig. 3 is a transverse section thereof on the line 3—3 of Fig. 1.

The raking drum is of that type which comprises a cylindrical body portion, usually made of sheet metal, its ends being closed by heads and there being a plurality of movable rake-heads within the cylinder, the teeth of these heads projecting through suitable apertures of the cylinder walls, and mechanism being provided for advancing and withdrawing the teeth.

The cylinder body is designated 10. To the ends of this body there are fitted the heads 11, 12, of cast metal, each consisting of an annulus and a hub, and spokes uniting the two. As the two heads are alike but one need be described.

At the inner side of the rim of the head there is an instanding annular flange 13, adapted to fit snugly within the cylinder 10. A similar but wider flange 14, projects outwardly and is adapted to carry a chain 15, forming a part of the elevating mechanism. At the inner edge of the flange 14 there is a radially-projecting flange 16, having apertures 17, as many as may be desired, for the reception of slats or bars 18, carried by the chain 15 and its companion at the opposite end of the drum, the sections of the flange 16 thus constituting teeth for driving these chains.

To an instanding annular flange 19 of the head there are pivotally attached a plurality of arms, as shown three in number 20, 21, 22, the free ends of corresponding arms at each end of the drum being united by the rake-heads 23, 24, 25. The raking teeth 26, 27, as many as may be required, are preferably of wire and are mounted upon the heads 23, 24 and 25. As shown they are formed in pairs of a single piece of wire coiled loosely around the head, as shown at 28, 29, to provide for proper resiliency of the teeth. The connecting portion 30 of the wire of which the pair of teeth is formed is bent to form a loop 31, and fits snugly into a longitudinal channel 30ª formed in the face of the rake head to which it is firmly secured by a headed stud or bolt 32 set into the head as 23. The teeth 26, 27, project outwardly from the wall of the drum, and as the arms carrying the rake-heads swing upon their pivots these teeth are advanced or withdrawn.

Cam plates are provided for effecting the positive withdrawal of the teeth, one at each end of the drum. These cam-plates 33, 34, are rigidly mounted upon a part of the frame of the machine, and each comprises a hub portion 35, forming a bearing for the shaft 36, fixed in the hub 37 of the drum head. From the inner face of each camplate 33 there projects inwardly a pair of flanges 38, 39 preferably continuous, these flanges being spaced apart to form a runway for the studs 40, one carried by each of the arms 20, 21 and 22, the configuration of the flanges providing for the desired movement of the arms.

The outer flange 38 serves to limit the outward movement of the teeth. It is, however, called upon to perform little service except when the teeth are in the lower part of their cycle of movement. It is nearly circular in form, being, however, eccentric as to the drum, its longest radii being downwardly directed. The cam flange is curved inwardly, as shown at 41, at that portion engaged by the stud 40, as it descends in its travel. The pivot attaching the rake-head carrying arm to the head of the drum being in advance of the rake-head, the latter tends to swing inwardly during the descending movement, and this tendency is overcome by the curvature 41 of the cam, the stud 40 being arrested in its movement thereby bringing the arm to an upright position and eventually tilting it in the opposite direction, permitting it to fall by gravity as the stud 40 passes beyond the cam shoulder. The stud 40 now resting on the lower portion of the flange 38, the teeth are fully extended. From its lowest portion this cam flange begins to recede from the periphery of the drum, thereby causing the inward movement of the teeth as the stud 40 travels upward and positively withdrawing the teeth from the hay as the latter is engaged by the upward turn of the elevator carrier. From this point, during the remainder of the cycle of the stud 40, while the flange will prevent its outward movement the rake-head, is, however, held in the retracted position by gravity.

The cam flange 39 limits the inward movement of the rake-heads. While it is preferably continuous, its lower portion is without function save to strengthen the structure, and is curved inwardly to allow free play of the rake-heads should the teeth encounter obstructions which force them inwardly. Through the remainder of the cycle it serves as a support for the studs 40, limiting the inward movement of the rake-heads. That portion of this cam which is opposite the shoulder 40 of the cam flange 38 coöperates with the latter in effecting the outward swing of the rake-head carrying arms, as already described.

The spokes 42, 43, 44 of the head of the drum are so formed and disposed as to provide apertures 45 for the accommodation of the studs 40.

We claim as our invention—

1. In a raking drum, in combination, a hollow rotatable cylinder having heads, freely swinging arms pivotally attached to the cylinder heads, rake-heads carried by the arms, and stationary cams for swinging the arms inwardly during the upper portion of their cycle of movement, the arms being free to move inwardly during the lower portion of their cycle of movement.

2. In a raking drum, in combination, a hollow cylinder, raking teeth secured within the cylinder and longitudinally movable through its peripheral wall, means for retracting the teeth during a portion of their cycle, the teeth being gravity-projected through another portion thereof.

3. In a raking drum, in combination, a hollow rotatable cylinder, swinging arms pivoted to the cylinder heads and projecting backwardly with reference to the direction of rotation, rake-heads mounted on the arms and having teeth projecting through the cylinder walls, a stationary cam for swinging the arms inwardly during their upward travel and arranged to hold them against inward movement during their downward travel.

4. In a raking device, in combination, a rotatable cylinder, teeth pivotally mounted within the cylinder and projecting through its periphery, said teeth being free to swing when in the raking position.

5. In a raking device, in combination, a rotatable cylinder, teeth pivotally mounted within the cylinder and projecting through its periphery, such teeth being free to swing when in the raking position, and means for positively controlling the teeth during the elevating and releasing portion of their cycle.

6. In a raking drum in combination, a hollow cylinder raking teeth secured within the cylinder and longitudinally movable through its peripheral wall, the teeth being yieldingly advanced during the working portion of their cycle.

7. In combination, a pair of rotatable heads, rake bars having outwardly directed teeth extending between the heads, and swinging arms pivotally attached to the rotatable heads for carrying the rake bars whereby the raking teeth are free to rise and fall in passing over obstructions during the raking portion of their cycle.

8. In combination, a pair of rotatable heads and rake bars having outwardly directed teeth extending between the heads and movably secured thereto whereby the teeth of the rake bars are free to rise and fall in passing over obstructions during the raking portion of their cycle.

9. In a raking drum, in combination, a hollow rotatable cylinder having heads, swinging arms pivotally attached to the cylinder heads, rake heads carried by the arms, the arms being free to move inwardly during the lower portion of their cycle of movement.

CHARLES E. WHITE.
CHARLES H. WHITE.

Witnesses:
Wm. B. Samuel,
Thos. V. Maguire.